United States Patent [19]

Malinowski

[11] 4,112,310

[45] Sep. 5, 1978

[54] SMOKE DETECTOR WITH PHOTO-RESPONSIVE MEANS FOR INCREASING THE SENSITIVITY DURING DARKNESS

[75] Inventor: William J. Malinowski, Pembroke, Mass.

[73] Assignee: Chloride, Incorporated, Tampa, Fla.

[21] Appl. No.: 798,582

[22] Filed: May 19, 1977

[51] Int. Cl.[2] .............................................. G01N 21/26

[52] U.S. Cl. .................................... 250/574; 340/630; 356/207

[58] Field of Search ............ 340/237 R, 237 P, 237 S; 250/564, 573, 574; 356/207, 208

[56] References Cited

U.S. PATENT DOCUMENTS

| | | | |
|---|---|---|---|
| 3,150,264 | 9/1964 | Ehlert | 250/574 |
| 3,924,252 | 12/1975 | Duston | 340/237 S |
| 3,997,271 | 12/1976 | Brugger et al. | 356/207 |

*Primary Examiner*—David C. Nelms
*Attorney, Agent, or Firm*—Robert E. Ross

[57] ABSTRACT

A particle detector which during periods of high ambient light is responsive to a particle concentration of a predetermined value to provide an output signal and during periods of low ambient light, is responsive to a substantially lesser particle concentration to sound an alarm.

9 Claims, 5 Drawing Figures

SMOKE DETECTOR WITH PHOTO-RESPONSIVE MEANS FOR INCREASING THE SENSITIVITY DURING DARKNESS

BACKGROUND OF THE INVENTION

Smoke detectors of various types such as ionization and photo-electric are finding increasing use in both residential and industrial structures. These detectors are responsive to a predetermined concentration of smoke to provide an output signal to sound an alarm. For example, one type of detector, utilizing light reflected from smoke particles, onto a photo-responsive device, has circuit parameters such that an alarm is sounded when the smoke concentration reaches a density that will obscure between 1% and 2% of the light in a column of smoke 1 foot long.

Smoldering fires often take considerable time to produce a smoke concentration of 1%, and it would be desirable to have the alarm actuated at a lesser concentration, for example 0.2% to 0.4%. However, a smoke detector with such a low sensitivity is subject to false alarms from various causes, such as tobacco smoke, cooking smoke, dust, and industrial fumes.

SUMMARY OF THE INVENTION

A smoke detector is provided which is responsive, during conditions of high ambient light such as daylight or normal artificial light, to a predetermined smoke concentration, such as 1%, to provide an output signal to sound an alarm and which is provided with means for increasing the sensitivity of the device during periods of low ambient light, such as at nighttime or in unilluminated industrial spaces, so that it produces an output signal at a substantially lesser concentration, for example 0.2%.

In one embodiment of the invention, the increase in sensitivity is accomplished photo-electrically; that is, a photo-responsive device viewing the ambient light is so connected into the detector circuit as to increase and decrease the sensitivity of the detector with decreases and increases, respectively, of ambient light. The photo-responsive device may be, for example, a photo-resistive cell, a photo-generative cell, a photo-transistor, etc.

Since the causes of most false alarms are generated by the activity of people in the space being monitored, and since in the normal installation when there is no illumination, either natural or artificial, present, it is unlikely that there will be any activities being carried on to generate smoke or dust. Hence during periods of darkness the sensitivity of the detector can be increased without danger of a false alarm occurring from such causes. Such increase in sensitivity at night is particularly desirable since statistics show that 75% of deaths due to smoke occur between 11 P.M. and 6 A.M.

DESCRIPTION OF THE ILLUSTRATED EMBODIMENTS

Figure 1:
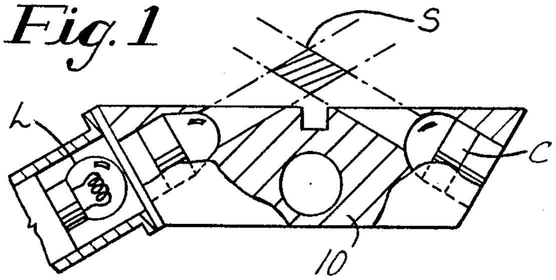
FIG. 1 is a schematic diagram of the optical components of a photo-electric detector of the type with which the present invention can be utilized.

FIG. 1 of the drawing is a schematic diagram of the arrangement of the physical components of a photo-electric smoke detector with which the present invention can be utilized, comprising a support block 10, carrying a light source L positioned to illuminate smoke particles S appearing in the space in front of the block, and a photo-responsive device C viewing the volume illuminated by the light. The light source L may be of incandescent, glow tube, or electronic (light emitting diode) origin, and the photo-responsive device may be photo-resistive or photogenerative, as desired for a particular circuit. The light may be pulsing or continuous.

The block 10 and the associated components may be enclosed in a suitable housing to allow the entrance of ambient atmosphere but to exclude ambient light. Housings for this purpose are well known in the art.

Figure 2:
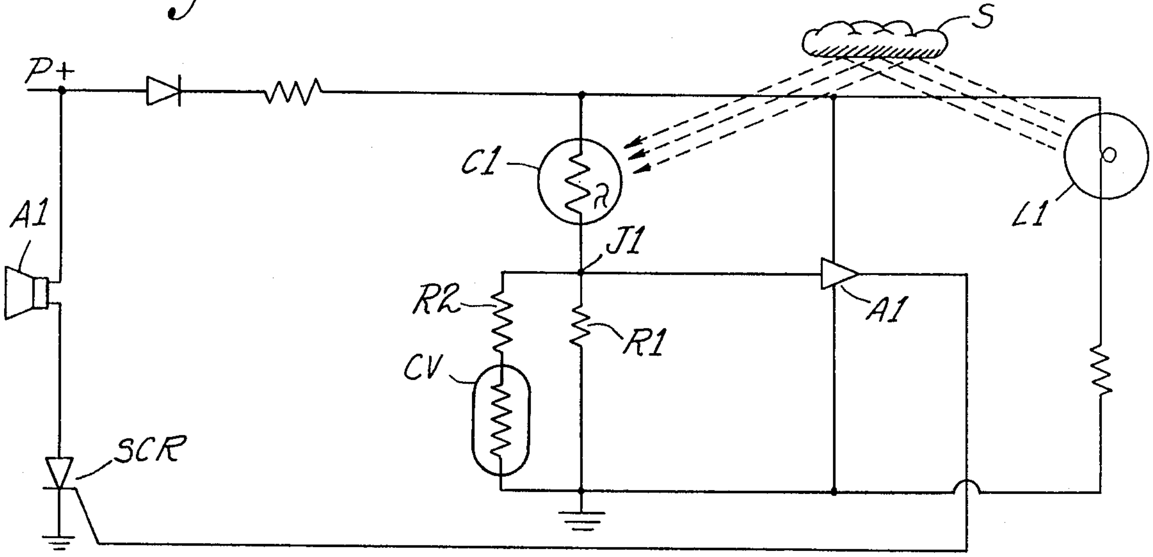
FIG. 2 is a schematic diagram of an electrical circuit of a photo-electric detector embodying the features of the invention.

Referring to FIG. 2, there is illustrated a schematic diagram of an electrical circuit of a smoke detector embodying the invention, comprising a light source L1, a photo-resistive cell C1 connected in series across a power source with a resister R1 through a junction J1, which junction provides the input to an amplifier A1, the output of which is connected to the gate of a controller switch SCR, the anode and cathode of which are connected in series with an alarm device A1 across the power source. The presence of smoke in the viewing area of the cell C1 illuminated by the light L1 cause C1 to drop in resistance raising the voltage at J1. When the J1 voltage reaches a predetermined value the output of the amplifier becomes high enough to trigger SCR into conduction energizing the alarm A1.

The above-described portion of the circuit is in common use in several types of smoke detectors.

To render said circuit automatically responsive to a decrease in ambient light to increase its sensitivity, a photo-resistor cell Cv is connected in parallel with resistor R1 and in series with limiting resistor R2, said cell being physically positioned to view ambient light in the vicinity of the detector.

During daylight hours, or when the space being monitored by the detector is artificially illuminated, the resistance of the cell Cv is low. The value of R1 and R2 and the circuit parameters of the amplifier A1 are such that a predetermined smoke concentration (such as 2%) is required to lower the resistance of C1 to a value such that the voltage at J1 rises to a value that will actuate the alarm.

However, as the intensity of the ambient light decreases, the resistance of cell Cv increases, thereby increasing the resistance between J1 and ground. Hence the resistance drop of cell C1 required to produce the required alarm voltage at J1 is less, and said resistance drop is produced by a lesser smoke concentration. In total darkness, the resistance of cell Cv is substantially infinite, so that the voltage at J2 is determined only by the relative resistance of C1 and R1.

Figure 3:
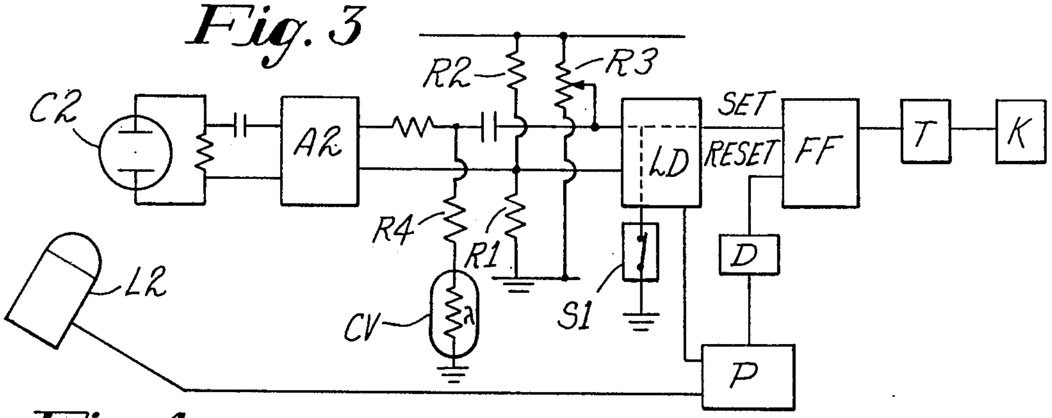
FIG. 3 is a schematic diagram of an electric circuit of another form of photo-electric detector embodying the features of the invention.

Referring to FIG. 3 there is illustrated another form of electronic smoke detector circuit embodying the features of the invention, which comprises a light emitting diode light source L2, a photo-voltaic cell C2 capacitor coupled to an amplifier A2. The amplifier output is connected to the input of a level detector LD, the output of which is connected to the set terminal of a bi-stable switching device such as a flip-flop FF. The flip-flop output is fed through an integrator T to an alarm actuating device K.

A pulse generator P supplies pulses to energize the light emitting diode L2, to turn on the level detector LD, to re-set the flip flop FF and to the normally closed electronic switch S1, connected from the signal lead to ground, to open said switch during the time that L2 is emitting light and the level detector is energized.

Light reflected from smoke particles illuminated by L2 pulse falls on the photo-voltaic cell C2 causing a voltage pulse which is amplified by the amplifier A2, the output of which, if of sufficient magnitude, passes through the level detector to the set terminal of the flip-flop to provide an output signal to the integrator, which signal continues until the beginning of the next pulse. The discriminator D converts the pulse from the pulse generator into a spike pulse to the flip-flop re-set terminal at the beginning of each pulse cycle, so that at the start of each pulse, the flip-flop output is turned off. Two or more consecutive output signals into the integrator may be required to actuate the alarm.

The above-described smoke detector circuit is described and claimed in my U.S. Pat. No. 3,946,241 issued May 25, 1976, and as shown therein, provides means for making minor adjustments in the sensitivity of the device, to compensate for variations in the electrical characteristics of the various components, said means comprising voltage divider resistors R1 and R2 connected across the power source, with their junction connected to one of the inputs to the level detector, and a variable resistor R3 connected across the power source, with the tap thereof connected to the other input to the level detector. The sensitivity adjustment provided by resistors R3 is accomplished during the manufacturing process and is not thereafter adjusted, except possibly during repair of the unit.

To enable the sensitivity of the circuit to increase automatically when the ambient light decreases, a photo-resistive cell Cv, which is positioned to observe ambient light, is connected in series with a resistor R4 between one of the amplifier output terminals and ground.

During periods of high ambient light, such as during daylight or when artificial illumination is being used, the cell Cv is at a low resistance, so that the resistance from the signal lead to ground is substantially that of the resistor R4.

Therefore during periods of high ambient light, a portion of the amplifier A2 output flows to ground, and the circuit parameters are such that when the concentration of smoke (in high ambient light conditions) reaches the level at which the alarm is to be sounded, the amplifier output is high enough to cause the level detector to provide an output signal to the flip-flop.

However, under conditions of darkness, the resistance of cell Cv increases so that the resistance of the path to ground through R4 and Cv is substantially infinite. A lesser output from amplifier A2 is therefore required to provide the signal level required to produce an output signal from the level detector, and since this smaller amplifier output can be produced by a lesser concentration of smoke viewed by the cell C2, the detector is more sensitive under conditions of low ambient light.

Figure 4:
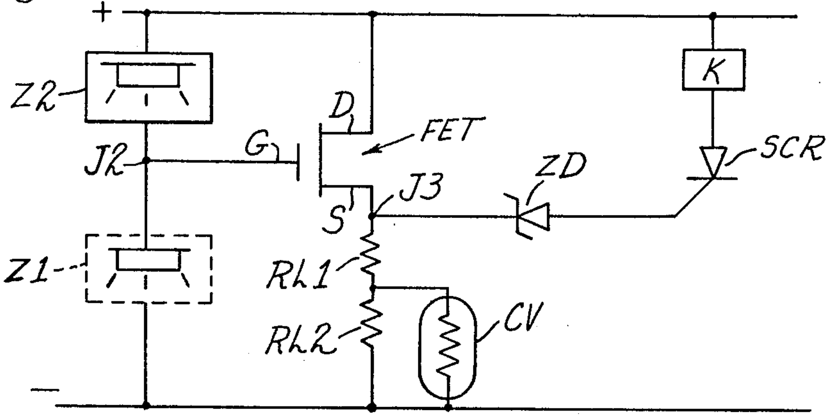
FIG. 4 is a schematic diagram of an electric circuit of an ionization smoke detector embodying the features of the invention.

Referring to FIG. 4 of the drawing, there is illustrated a smoke detector of the ionization type embodying the features of the invention, comprising an open ionization chamber Z1 and a closed ionization chamber Z2 connected in series through a junction J2 across a power source, said junction being connected to the gate of a field effect transistor FET, the source-drain path of which is connected across the power source. The output signal from the field effect transistor is taken across the resistance between the source electrode S and the negative supply terminal, which signal is applied to the gate of a silicon-controlled rectifier SCR, the anode-cathode path of which is connected in series with an alarm K across the power source.

The power source provides a constant ionization current through both ionization chambers. When there is no smoke present in the ambient air, the voltage at junction J2 has a predetermined value.

Under these conditions the current through the source-drain path of the field effect transistor is either zero or has a value such that the voltage drop across the load resistance (between S and the negative supply terminal) does not exceed the breakdown voltage of the zener diode ZD. Hence no signal is applied to the gate of SCR.

When smoke enters the open ionization chamber Z1, its impedence is increased and ionization current will decrease, which causes the voltage at junction J2 to increase, which increases the potential at gate electrode G of the FET. The current in the source-drain path of the FET therefore increases, which increases the voltage across load resistors RL1 and RL2. If the amount of smoke is sufficient to produce the required voltage between the source electrode S and the negative supply, the SCR will be triggered into conduction, actuating the alarm K.

The above-described portion of the circuit is a standard circuit used in commercial ionization detectors.

To render said circuit automatically responsive to a decrease in ambient light to make the detector more sensitive, a photo-resistive cell Cv is connected in parallel with load resistor RL2.

The cell Cv is positioned to be exposed to ambient light, so that during daylight hours, or when the space being monitored is artificially illuminated, its resistance is low, and during the period in which the space being monitored is dark, its resistance is high.

Therefore, during periods of high ambient light more current is required through the FET source-drain path to provide the necesary SCR trigger voltage, than is required during periods of darkness, since the resistance from J2 to the negative side of the power line is greater during low ambient light than during high ambient light.

The amount of smoke at ionization chamber Z1 necessary to provide the SCR trigger voltage is therefore less when the ambient light is low than when the ambient light is high.

In each of the above-described modifications of the invention, the range of sensitivity of the detector is maintained between predetermined upper and lower limits by the associated circuitry, so that even if the resistance of the cell varies from zero to infinity, the sensitivity of the device will not go above or below said predetermined limits. For example, in FIG. 2, the maximum sensitivity, occurring when the photo-cell Cv is dark, cannot exceed a value determined by the resistor R1; and the minimum sensitivity, occurring when the cell Cv is exposed to ambient light and therefore at a low resistance, cannot go below a value determined by resistor R2.

Figure 5:
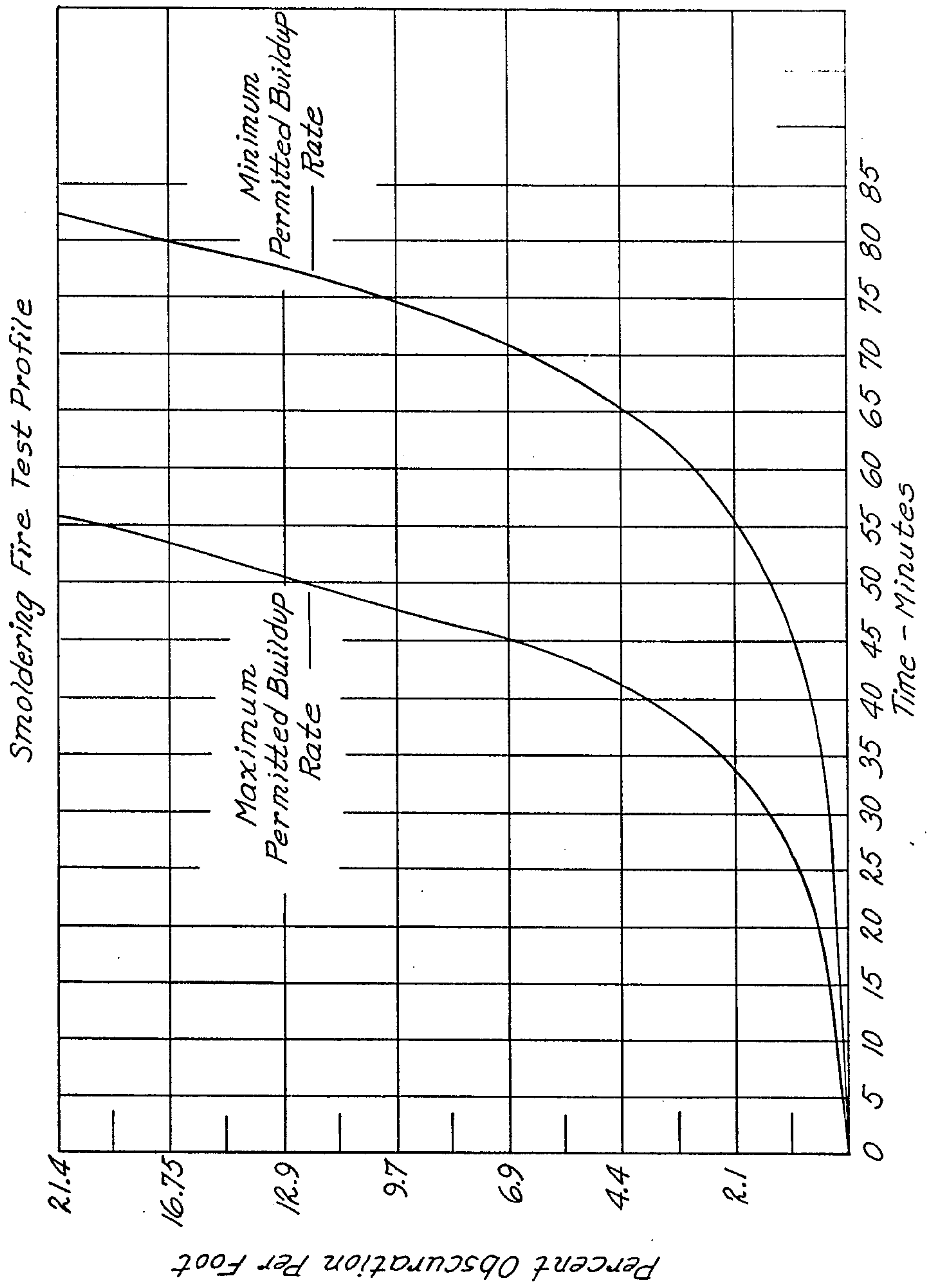
FIG. 5 is a graph used by Underwriters' Laboratories illustrating the maximum and minimum permitted build-up rates of smoke that can be used in a test of detector response to a smoldering fire, with percent obscuration per foot plotted against time.

Referring to FIG. 5, there is illustrated a graph illustrating maximum and minimum permitted rates of smoke build-up permitted in an Underwriters' Laboratry standard smoldering fire test. With the illustrated rates of build-up, a detector set to alarm at a smoke density of 2.0% obscuration per foot will alarm, at the maximum rate build-up in about 6 minutes, and at the minimum build-up rate in about 20 minutes.

Thus the increase in sensitivity from a 2% alarm point to a 0.2% alarm point gives an alarm 27 minutes earlier at the maximum permitted test rate and 34 minutes earlier at the minimum permitted test rate.

As previously stated, 75% of deaths from residence fires occur at night, and it has also been determined that 75% of residence fires are of the smoldering type. Hence the shortened alarm time is obviously very desirable.

Many modifications of the herein-described embodiments of the invention may be made, since it will be apparent to one skilled in the art that the photo-resistive device Cv can be incorporated into the illustrated circuits in various ways, with the same result.

Although the above-described embodiments of the invention utilize a photo-resistive cell as the sensitivity control responding to ambient light, other photo-responsive devices may, with suitable changes in circuitry, be used, such as photo-voltaic devices, photo-diodes, photo-transistors, etc., and therefore it is intended that all the embodiments disclosed herein be interpreted in an illustrative and not a limiting sense.

I claim:

1. A particle detector, in which means is provided responsive to the presence of particles to produce an output signal, said detector having two modes of operation and being responsive in a first mode to a predetermined concentration of particles to produce an alarm signal, and being responsive in a second mode to produce an alarm signal at a particle concentration substantially less than said predetermined concentration, in which the detector shifts automatically from one mode to another with a substantial change in the ambient light level.

2. A particle detector responsive to the presence of particles to provide an output signal, in which means is provided responsive to increases and decreases in ambient light level to decrease and increase, respectively, the sensitivity of the detector.

3. A smoke detector having means for actuating signal means at a smoke concentration of a predetermined level when the ambient light is at one intensity, and for actuating the signal means at a substantially lesser smoke concentration when the ambient light is at a lower intensity.

4. A smoke detector, comprising a light source illuminating a space, a first photo-responsive device and associated electrical circuitry producing an output signal in response to the receipt by said photo-responsive device of light reflected from said smoke particles, means responsive to an output signal above a predetermined value to energize alarm actuating means, and a second photo-responsive cell positioned to view ambient light, said second photo-responsive device being so connected into said circuitry as to cause a given smoke concentration to produce a greater output signal when the ambient light level decreases below a predetermined intensity compared to the output signal produced by said given smoke concentration when the ambient light level has a substantially higher intensity.

5. An ionization smoke detector, comprising a circuit including an ionization chamber having a pair of electrodes and a radioactive source and connected across power leads in series through a junction with a loading element, a gating device having a gate electrode connected to said junction, said gating device being responsive to an input signal from said junction of a predetermined value to cause conduction through said gating device, a photo-responsive device viewing ambient light, said photo-responsive device being so connected into said circuit that when the ambient light level is low, the signal at said gating device for a given amount of smoke is substantially higher than when the ambient light level is high.

6. A smoke detector, comprising detector means responsive to the presence of smoke to provide an output signal which is a function of smoke concentration, amplifier means receiving said output signal and producing an amplified output signal which is a function of the value of the output signal from the detector means, level detector means responsive to the amplified output of a predetermined level to actuate alarm energizing means, and photo-responsive means so associated with the detector that when the ambient light falling on said cell decreases to a predetermined value, the alarm is energized at a lower smoke concentration than the concentration at which the alarm is energized under conditions of substantial ambient light.

7. A smoke detector as set out in claim 6 in which the photo-responsive means is connected into the circuit so as to cause the output signal at a given smoke concentration to be substantially less under conditions of low ambient light than under conditions of high ambient light.

8. A smoke detector as set out in claim 6 in which said photo-responsive means is connected into said circuit so as to cause the output of the amplifier means to be greater for a given amount of smoke concentration during periods of darkness or low ambient light than during periods of daylight or high ambient light.

9. A smoke detector as set out in claim 6 in which said photo-responsive means is so connected into said circuit as to cause the level detector to be responsive to a lower output signal from the detector means during periods of low ambient light than during periods of high ambient light.

* * * * *